March 28, 1939.  A. C. GODDARD  2,151,695
TOASTING APPARATUS
Filed Dec. 18, 1936
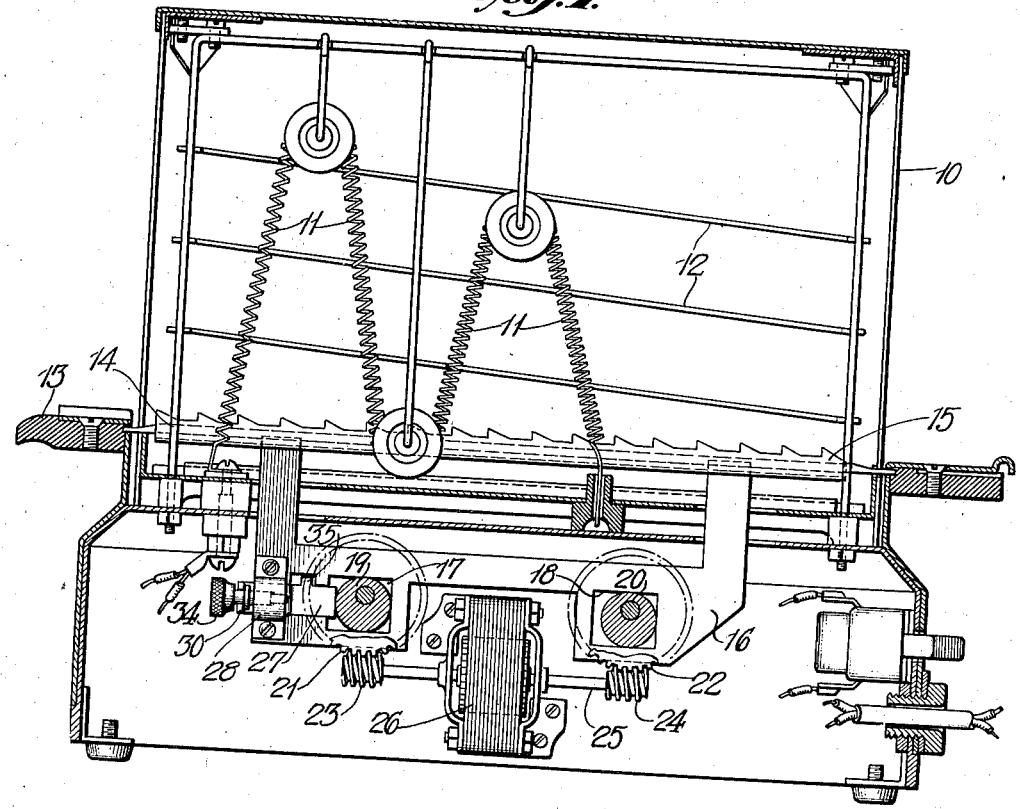
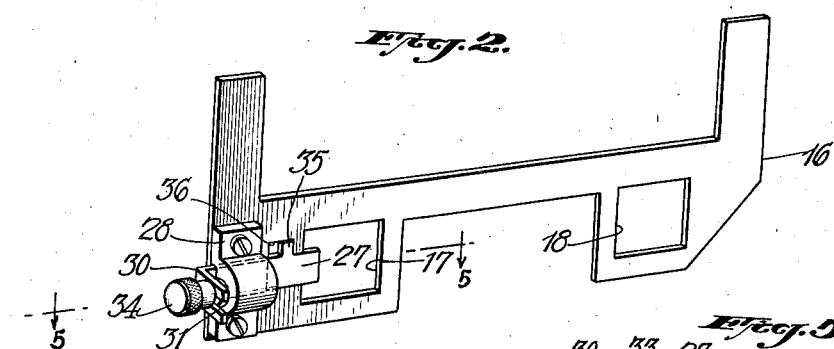
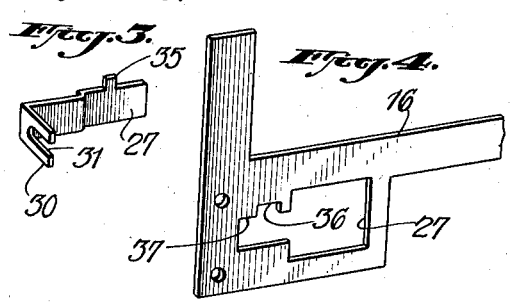
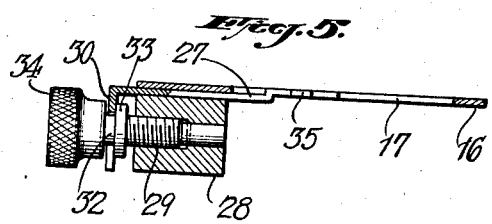
INVENTOR.
ALVIN C. GODDARD.
BY
ATTORNEYS Patented Mar. 28, 1939

2,151,695

UNITED STATES PATENT OFFICE 2,151,695

TOASTING APPARATUS

Alvin C. Goddard, Forest Hills, N. Y., assignor to Toastolator Company, Inc., New York, N. Y., a corporation of New York Application December 18, 1936, Serial No. 116,450

6 Claims. (Cl. 219—19)

My present invention relates to a toasting apparatus of the type in which bread is advanced horizontally between a pair of heating elements, and more particularly to mechanism whereby the length of the horizontal movements may be increased or decreased in accordance with an increase or decrease in the temperature of the heating elements so as to compensate for the latter and provide for a predetermined toasting effect for a given distance of travel of the bread.

A toasting apparatus of the above indicated type is described in a patent of De Matteis and Goddard No. 2,112,075 of March 22, 1938. In apparatus of this type a pair of heating elements are spaced to provide a horizontal toasting passage through which the bread to be toasted passes between suitable guides. The supporting elements as, for example, a rail or pair of rails at the bottom of the toasting passage, support the toast between the guides. An advancing element comprising a bar, or pair of bars, extending alongside of the supporting rails is periodically lifted above the rails to raise the bread free of them, then advance a short distance and lowered below the rails whereby the bread will be advanced at intervals through the passage.

The maximum toasting effect is obtained by starting the bread at the very entrance to the heating passage so that it is subjected to the heating effect for as long a time as possible. For a less intense toasting the bread is initially pushed into the passage so as to give it a shorter path of toasting. For a given length of path the toasting effect will depend upon the temperature of the heating elements which, in the case of electric heating elements of fixed reflecting surface, will depend upon the voltage. Consequently, a toaster which is adjusted to give the proper toasting effect with a given path of travel and time of passage will give a lesser toasting effect if the toaster be used at a point in the electric distribution system where the voltage is lower as, for example, nearer the end of the transmission or supply line.

My present invention provides a means whereby the toaster may be adjusted to different voltages so that when the voltage is lower, a longer time is required for the passage through a given distance between the heating elements and, with higher voltages, the toasting time for a given distance may be lowered. In the intermittent type of toaster this may be accomplished by shortening the horizontal movement of the advancing mechanism so that the rate of movement is lowered and the time increased.

The various features of the invention are illustrated in the accompanying drawing, in which—

Fig. 1 is a vertical longitudinal section of a toaster of the intermittent type embodying a preferred form of the invention.

Fig. 2 is a perspective view of a toast advancing mechanism and control or regulating means therefor.

Figs. 3 and 4 are perspective views of elements of the advancing means, and

Fig. 5 is a horizontal longitudinal section on line 5—5 of Fig. 2.

In the embodiment illustrated in the accompanying drawing the invention is shown as applied to the type of toaster shown in Patent 2,112,075 of March 22, 1938, in which the toast enters a passageway in a casing 10 and passes therethrough between a pair of heating elements 11, of which only one is shown, being guided and kept from contact with the heating elements by inclined guide wires 12. Upon reaching the opposite end of the passage, the toast passes out of the casing onto a platform 13 from which it is removed. In its passage between the guide wires and heating elements 11 the toast is at intervals supported on longitudinally extending bars 14 from which it is lifted at intervals by a toothed bar or bars 15, the bars being raised at intervals to lift the toast from the supporting bars 14, then moved to the left of Fig. 1 and again deposit the bread in a new advanced position to be again lifted and moved. The bar or bars 15 are supported on a carrying member 16 guided for limited vertical and horizontal movement and which is provided with a pair of eccentric openings 17 and 18.

Suitable eccentrics or cams 19 and 20 rotate in the openings 17 and 18, respectively, on axes transverse to the bars 14 and are driven by gear wheels 21 and 22 and worms 23 and 24. The worms 23 and 24 are supported on a common shaft 25 driven by a motor 26 so that the eccentrics are driven in synchronism and in the same phase. Consequently each end of the advancing bars 15 are raised equally and, at the same time, pass through the same movements of translation.

In the present invention one of the openings 17 may be partly closed to a greater or less extent by a sliding bar 27 so that there may be a greater or less amount of play between the opposite vertical sides of this opening and the eccentric or cam. Otherwise stated, the horizontal dimensions of this opening may be varied so that when moved toward the right, there is no loss or play between the eccentric and the sides of the opening so that the full horizontal component of the movement of the eccentric will be transmitted to the support 16 and bar 15, and it will have a maximum horizontal movement during each cycle. When the bar 27 is adjusted to the left of Figs. 1 and 2 so that there is some play between the vertical edges of the opening 17 and the eccentric or cam, there will be a lost motion between the cam and the element 16 and a part of the rotation of the cam during this last motion will not be transmitted to the element 16.

Consequently, the horizontal movement of the element 16 and bar 15 during each cycle will be shortened. With a given number of cycles per unit of time, owing to the constant speed of the motor 26, it will take more cycles and, consequently, a longer period of time for the bread to pass a given distance. Therefore, when the voltage on the heating elements 11 is lower than the maximum for which the toaster is designed, the plate 27 may be adjusted to the left to increase the horizontal dimension of the opening 17.

The openings 17 and 18 may be of any suitable dimensions. Where a circular eccentric is employed, the vertical dimensions of these openings will be equal to the diameter of the eccentric and their horizontal dimensions will be somewhat greater to give room for the adjustment of the plate 27. While rectangular openings are shown for convenience in illustration, it will be understood that other suitable shapes may be employed.

Any suitable means for supporting the plate 27 in its various positions of adjustment may be employed. In the specific embodiment illustrated the plate 27 is offset so that one part of it lies against one face of the element 16 and passes through a recess or slot in a block 28 bolted to the side of the element 16. The block 28 has an internally screwthreaded opening into which a screw 29 may be threaded. The screw 29 has a neck which receives a projection or flange 30 extending sidewise from the plate 27 and notched at 31 to pass through a neck 32 on the screw between a flange 33 and head 34 of the screw.

From the above it will be apparent that the screw 29 may rotate freely relatively to the plate 27 and, in moving back and forth into this threaded opening, will carry the plate 27 with it. To limit the movement of the plate 27 it is provided with an upward projection 35 which fits into a recess 36 of greater horizontal dimension in an extension 37 of the opening 27. A similar adjusting mechanism is not required for the plate 18, as only one opening and eccentric are required for the horizontal movement, the other serving to lift the advancing bar 15 in synchronism at each end.

While the invention has been illustrated in connection with a particular embodiment of the invention shown in Patent 2,112,075 of March 22, 1938, it will be obvious that it may be applied to other embodiments which require an adjustment of the time necessary for bread to pass throughout a given horizontal distance between a pair of heating or toasting elements.

What I claim is—

1. Bread toasting apparatus comprising a pair of heating elements spaced to form a toasting passage, supporting means at the bottom of said passage comprising recurrently acting means cyclically to lift a slice of bread from fixed position, advance it and replace it in its advanced position, actuating means for said supporting advancing means which comprises an eccentric engaging said advancing means in vertical and horizontal directions, and adjustable means to provide a horizontal play between said eccentric and said advancing means.

2. Bread toasting apparatus having a pair of heating elements spaced to form a toasting passage, a supporting bar extending longitudinally in the lower part of said passage, an advancing bar positioned alongside of said supporting bar, and actuating means to lift a surface of said advancing bar above said supporting bar, move it horizontally, drop it below said supporting bar and return it to position, said means comprising an eccentric rotating on an axis transverse to said bar, said bar actuating means having an opening to receive said eccentric, and a slidable means to vary the horizontal dimension of said opening.

3. In a toaster having heating elements and a toasting passage between said elements, recurrently acting means comprising a movable bar supporting element having a pair of openings, a pair of eccentrics rotating one in each opening on axes transverse to said passage to lift and advance bread to be toasted at successive intervals in said passage, and a plate slidable horizontally to vary the horizontal dimension of at least one of said openings.

4. In a toaster having heating elements and a toasting passage between said elements, recurrently acting means comprising a movable bar supporting element having a pair of openings, a pair of eccentrics rotating one in each opening on axes tranverse to said passage to lift and advance bread to be toasted at successive intervals in said passage, a plate slidable horizontally to vary the horizontal dimension of at least one of said openings, and a screw engaging said plate to move it and hold it in horizontal positions of adjustment.

5. In a toaster having heating elements and a toasting passage therebetween, recurrently acting means having an opening, an eccentric rotating in said opening on an axis transverse to said passage to lift and advance bread to be toasted therein, and a plate slidable horizontally to vary the horizontal dimension of said opening.

6. The apparatus of claim 5 in which said opening has a greater horizontal than vertical dimension.

ALVIN C. GODDARD.